US006146717A

United States Patent [19]

Lienert et al.

[11] Patent Number: 6,146,717

[45] Date of Patent: Nov. 14, 2000

[54] METHOD OF IMPREGNATING COMPONENTS

[75] Inventors: Klaus-Wilhelm Lienert, Hamburg; Rainer Blum, Ludwigshafen; Günter Hegemann, Hamburg; Manfred Eichhorst, Oststeinbek, all of Germany

[73] Assignee: Schenectady International, Inc., Schenectady, N.Y.

[21] Appl. No.: 09/308,116

[22] PCT Filed: Nov. 13, 1997

[86] PCT No.: PCT/EP97/06325

§ 371 Date: Jun. 23, 1999

§ 102(e) Date: Jun. 23, 1999

[87] PCT Pub. No.: WO98/22962

PCT Pub. Date: May 28, 1998

[30] Foreign Application Priority Data

Nov. 21, 1996 [DE] Germany ............................ 196 48 134

[51] Int. Cl.[7] .................................. C08J 7/04; B05D 5/12

[52] U.S. Cl. .......................... 427/595; 427/493; 427/498; 427/512; 427/116

[58] Field of Search ..................................... 427/493, 498, 427/512, 116, 595

[56] References Cited

U.S. PATENT DOCUMENTS

| | | | |
|---|---|---|---|
| 3,914,467 | 10/1975 | Akao et al. | 427/116 |
| 3,937,855 | 2/1976 | Gruenwald | 427/54 |
| 4,247,578 | 1/1981 | Skinner et al. | 427/44 |
| 4,649,640 | 3/1987 | Ito et al. | 29/605 |
| 4,792,462 | 12/1988 | Smith et al. | 427/49 |
| 5,780,117 | 7/1998 | Swartz et al. | 427/493 |
| 5,932,297 | 8/1999 | Tatsuno et al. | 427/493 |
| 5,935,661 | 8/1999 | Biller et al. | 427/474 |

FOREIGN PATENT DOCUMENTS

| | | | |
|---|---|---|---|
| 0 643 467 A2 | 9/1994 | European Pat. Off. | H02K 15/12 |
| 295 056 A5 U | 6/1990 | Germany | H02K 15/12 |
| 40 22 235 A1 | 7/1990 | Germany | B29C 53/56 |
| 195 42 564 A1 | 11/1995 | Germany | B05D 7/26 |

OTHER PUBLICATIONS

Hawley, Gessner G., The Condensed Chemical Dictionary, 10th ed., p. 340.

*Primary Examiner*—Shrive Beck
*Assistant Examiner*—Jennifer Kolb
*Attorney, Agent, or Firm*—Pillsbury Madison & Sutro, LLP Intellectual Property Group

[57] ABSTRACT

The invention comprises a process for impregnating components with polymerizable impregnants which are liquid at room temperature or can be liquefied by heating and are cured by combined use of heat and high-energy radiation, wherein the components are impregnated at ambient temperature or in a preheated state and, after impregnation, are heated in the impregnant until partial gelation occurs, are treated with high-energy radiation before full curing and are then fully cured by thermal means.

14 Claims, No Drawings

METHOD OF IMPREGNATING COMPONENTS

The invention relates to a process for impregnating components with polymerizable compositions which are liquid at room temperature or can be liquefied by heating and are curable by combined use of heat and high-energy radiation.

Processes for impregnating components with polymerizable compositions which are curable by means of heat and/or high-energy radiation are known.

DE-A-40 22 235 and DD-A-295 056 propose, after impregnation of the component, to first cure the surfaces using UV radiation and to then cure the interior of the components by application of heat. Although such processes do reduce the vaporization losses, the losses are still relatively high as a result of the high proportions of volatile, nonpolymerizable monomers in the interior of the components. Ways of influencing the non-uniform impregnant distribution in the component are not mentioned in these publications.

EP-A-0 643 467 proposes improving the impregnant distribution in the component by achieving pregelling and fixing of the impregnant and thermal curing during impregnation by means of coil heating. At the same time as the thermal curing on the windings or else after thermal curing on the windings, those places in the components which have not been reached by the heating of the windings are to be cured with high-energy radiation, preferably UV radiation. A disadvantage of this process is that only partial curing is achieved by heating via the windings and full curing is then carried out using radiation. Since all known components have places which are not reached by partial thermal curing and are in a shadowed region during post-curing using radiation, components which have been treated according to EP-A-0 643 467 always have regions in which the impregnant has been only insufficiently cured. This results in undesired emissions from these regions and the impregnant cannot fully satisfactorily fulfill its functions in those places. Another procedure proposed in EP-A-0 643 467 according to which the thermal curing is followed by curing with high-energy radiation seems not to be appropriate industrially since such curing after full thermal curing of the places in the component not reached in the first partial curing step, regardless of whether it is carried out by sufficiently long electric heating of the winding or by other application of heat, brings no discernible advantages. Furthermore, EP-A-0 643 467 provides no teachings regarding the use of the process in the impregnation techniques which are claimed generally. Thus, pregelling by heating of the windings during impregnation is not appropriate because the voids are filled in an undefinable manner. Preheating the windings to lower the viscosity and thus to accelerate the filling is known prior art, eg. in the various dipping and flooding processes in which the components are heated in order to lower the viscosity and thus achieve better and more rapid filling. Heating to the gelation point during impregnation has the opposite effect, namely undefined filling of the voids as a result of gelation.

The procedure of gelation during impregnation is only conceivable when the impregnant properties and all process parameters are absolutely constant, but it always remains very susceptible to problems. Even in the case of small deviations, inner regions of the windings can be screened by pregelled impregnant and thereby remain unfilled. The preheating of the windings proposed in EP-A-0 643 467, for example to 180° C., leads on immersion to undefined gelation on the hot coil and very nonuniform distribution of the impregnant in the component. A lesser degree of preheating does reduce the impregnant temperature in the immediate vicinity of the winding and thereby aids the impregnation process, but as soon as the preheating temperature is increased to the point at which gelation occurs during impregnation this also results in nonuniform distribution of the impregnant.

The polymeric constituents of known impregnation, sealing and coating compositions for electrical components, for example motor windings or transformer windings, are preferably unsaturated polyesters dissolved in vinylically unsaturated compounds such as styrene, vinyltoluene, allyl phthalate and monomeric or oligomeric acrylic or vinyl esters, which are free-radically (co)polymerized. For the purposes of the present invention, impregnation, sealing and coating compositions are resin compositions in general which are employed in electrical engineering for impregnating windings using the generally known methods such as dip impregnation, the drip process, dip rumbling and flooding; these methods may, if desired, be aided by application of vacuum and/or pressure.

Disadvantages of these processes of the prior art result from the unsaturated monomers which are absolutely necessary for rapid and complete curing of the compositions. Examples of such substances are monomeric or low molecular weight oligomerized acrylates, allyl phthalate, styrene, α-methylstyrene and vinyltoluene. These substances are harmful to health and irritate the skin. In known applications of impregnants containing these substances, vaporization losses of from 20 to 30% by weight occur. Such considerable amounts of vaporized impregnant constituents have to be removed from the place of work in order to avoid health hazards for the workforce. The vaporized material which has been extracted is generally disposed of by waste air incineration, resulting in undesired emissions. The burnt impregnant constituents also represent considerable losses from an economic point of view.

Further problems arise in setting the optimum degree of filling of the voids present in the component. In general, a very high degree of fill is desired for physical reasons, but a degree of fill which is technically just sufficient is often desired for cost reasons.

In the case of low-viscosity materials, there is the risk that an undefined part of the impregnants runs out of the components prior to curing or very nonuniform impregnant distributions are established in the component. According to the known processes, it has hitherto not been possible to achieve high degrees of fill, for example above 90%.

The problem of unsatisfactory impregnant distribution in the component also occurs in the case of monomer-free impregnation resins as are described, for example, in the as yet unpublished German Patent Application P 195 42 564.2 and in the case of epoxy resins in which the disadvantages of the volatile monomers do not occur.

The process of the invention solves the abovementioned problems by partial gelation or partial curing of the impregnated components while still in the impregnant, subsequently allowing the ungelled impregnant to run off, if desired returning, if appropriate after cooling, this impregnant which has run off to the impregnant stock, detackifying the component surfaces with high-energy radiation and finally curing them fully by thermal means.

The process of the invention makes it possible for the first time to achieve substantially uniform filling with impregnant to any degree of fill at virtually any place in the components. The emission of volatile impregnant constituents is reduced to such an extent that virtually no impregnant losses occur. This process is particularly advantageous for dip impregnation techniques in which virtually no monomers can escape from the dipping unit during partial curing which occurs in the immersed state. Furthermore, a major part of volatile monomers is fixed in the resin composition in the immediate vicinity of the heated inner regions of the components. A desired degree of fill of the component can here be set by adjusting heating rate, temperature and heating time. Preferably, this process can be employed for dipping at room temperature and electric coil heating shortly before, during or after immersion. At first only a little heat is applied in order to obtain rapid filling of the inner regions of the component, then the temperature of the impregnant is increased. This causes gelling of the impregnant only in the immediate vicinity of the heated coils. The main masses of component and impregnant only heat up a little, so that only small vaporization losses occur when taking out the component. After taking out the component, advantageously after a delay time which depends on the shape and size of the component and the viscosity of the impregnant and during which the ungelled impregnant can run off and, preferably after cooling, is returned to the impregnant stock, the surfaces of the components are irradiated with high-energy radiation, preferably UV light. This results in a great reduction in the further evaporation of monomers which are not yet bound and to detackifying of the surface which is necessary for problem-free further handling of the impregnated components even in the case of monomer-free impregnants, for example comprising cyclopentadiene building blocks as are described, for example, in the as yet unpublished German Patent Application P 195 425 64.2, or in the case of epoxy resins. As a result of restricting the action of heat to control the degree of fill, the impregnant in the interior of the components is generally not yet completely cured, so that further thermal curing is usually required. Owing to the fact that the residual monomers are already substantially fixed in the components in this process step and the component surfaces have been detackified, only slight vaporization emissions occur even if a delay time is inserted before further thermal curing.

Relatively large components are advantageously further cured immediately afterwards, for example by further supply of electric power to the winding, while in the case of smaller components it is often advantageous to collect a number and to fully cure them, for example in a heating chamber, at a later point in time.

A further advantage of the process of the invention is that it can be carried out in existing or only slightly modified plants since it can be carried out essentially by changing the control parameters and the process order.

Impregnants which can be used in carrying out the process of the invention are, in particular, the generally known impregnants based on unsaturated polyester resins which become free-radically copolymerizable upon mixing with unsaturated monomers as reactive diluents. Advantageous polyesters are known to those skilled in the art, likewise imide- or amide-modified polyesters which have particularly favorable thermal and mechanical properties. The advantageous reactive diluents are also known, use being made, in particular, of styrene, α-methylstyrene, vinyltoluene, allyl esters, vinyl esters, vinyl ethers and/or (meth)acrylates. These polyester resin compositions can be cured thermally and/or using high-energy radiation, preferably UV light, using initiators or catalysts or catalyst mixtures which are likewise known to those skilled in the art.

Further impregnants which can be used in carrying out the process of the invention comprise free-radically polymerizable monomeric, oligomeric and/or polymeric materials which can also be cured by radiation, in particular using UV light.

Such materials and combinations of materials are also generally known to those skilled in the art. They are, in particular, allylically, vinylically or (meth)-acrylically unsaturated materials and/or mixtures of materials. Examples of well suited materials are poly-epoxy(meth)acrylates, polyurethane (meth)acrylates and/or polyester (meth)acrylates. Some of the impregnants are directly polymerizable by thermal means, but it is preferred to add free-radical initiators for optimal thermal curing at temperatures which are as low as possible. Furthermore, UV initiators are generally added in order to ensure rapid UV curing.

Furthermore, the impregnants used can contain stabilizers for improving the storage stability. It is also possible for ionically polymerizable materials to be present in the impregnants, in particular monomeric and/or oligomeric epoxides in combination with initiators which can be activated thermally and under UV light. The selection of the materials for carrying out the process of the invention is the responsibility of a person skilled in the art who has to consider technical suitability, availability and/or costs.

The process of the invention avoids the disadvantages of the processes of the known prior art by means of the specific combination of its process steps, namely in that impregnant distribution and degree of fill are regulated by controlled heating of the components after impregnation, still in the impregnation apparatus, until gelation and fixing of the impregnant occur, in that the drip-off losses are minimized by allowing the ungelled impregnant to run off after the component is taken from the impregnation apparatus, in that, if desired, this impregnant which has run off is, if appropriate after cooling, returned to the impregnant stock, in that the vaporization losses on the component surface and surface stickiness are eliminated by use of high-energy radiation and in that complete thermal curing is then carried out until optimal functions of the impregnant are achieved. This order of events according to the invention is of great industrial, ecological and economical use.

In a particularly preferred embodiment of the invention, impregnation techniques in which the components are introduced fully or partly into the impregnants are carried out by introducing the components and allowing them to take up the impregnant and then heating the coils electrically until partial gelation occurs. The rapidity, maximum temperature and duration of this heating enables, depending on the reactivity of the impregnants, the degree of fill to be regulated very accurately and reproducibly. After this partial curing in the immersed state, the components are taken from the impregnant and the ungelled impregnant is allowed to run off. In most cases, the impregnant which runs off can, if appropriate after cooling, be returned to the impregnation bath. The adhering impregnant can also run off the outsides of the components (bundles of laminations) on which, as a rule, no or only little impregnant is desired; this process is aided by the heat flow from the heated regions which gradually penetrates to the outside. The action of high-energy radiation, preferably UV radiation, seals the surfaces of the components. Volatile constituents of the impregnant are substantially fixed in the component by the pregelation and on the surface by the irradiation. Only minimal emissions occur during the subsequent full thermal curing.

The following examples illustrate the invention.

EXAMPLES

The experiments were carried out using the commercially available impregnant Dobeckan FT 2006/350UV® which can be cured both thermally and using UV light.

The components were stators of production-line electric motors of the size IEC 96 whose end windings are fixed in an injection-molded part made of polyamide thermoplastic.

The following are assessed:

Resin uptake, by weighing the component before impregnation and after curing,

Drip-off losses which can no longer be recycled because of partial gelation, by weighing the partially gelled impregnant which drips off during curing, Vaporization losses during curing, by weighing the component before and after curing, minus the drip-off losses, After curing, residual styrene (or other impregnant constituents which have not been bound) which can still be vaporized by further curing, by weighing the component before and after further curing (further curing losses).

Comparative Example 1 (CE 1)

Component and impregnant are at a room temperature of 26° C. The component is immersed at 35 mm/minute, taken out again after 1 minute at the same speed, allowed to drip above the dipping bath, then cured for 1 hour at 140° C. in an oven, weighed after cooling and subsequently cured further for 2 hours at 140° C.

Comparative Example 2 (as in Example 1 of EP-A-0 643 467) (CE 2)

Impregnation is carried out according to the procedure in CE1 and, after the impregnant has been allowed to drip off, the winding is heated for 2 minutes at 150° C. by means of electric current. Dripping had largely stopped before heating, but on heating a great amount of impregnant immediately comes out again; some of this is partially gelled and cannot be recycled. Further heating is carried out for 10 minutes at a winding temperature of 150° C.; during this procedure, the bundle of laminations heats up to about 80° C. and the plastic arts of the end windings heat up to about 45° C. Bundle of laminations and end windings are still sticky. The heating of the windings is then switched off and the stator is irradiated for 5 minutes in a UV light chamber provided with a plurality of intermediate-pressure mercury vapor lamps having an energy maximum at a wavelength of about 365 nm and an irradiation energy of about 8 $mJ/cm^2$. After this, the surface is largely tack-free, shadowed regions of the component which are nevertheless still accessible to contact are still slightly sticky. The component is weighed, allowed to cool and on the next day cured further for 2 hours at 140° C. During this procedure, the remaining stickiness disappears and the further curing losses can be determined by weighing.

Comparative Example 3 (CE 3)

The procedure of CE2 is repeated, but the components are not allowed to drip after removal from the impregnant bath; instead they are immediately heated by means of electric power. Here too, the impregnant which comes out is partially gelled almost immediately and recycling is not possible. The total losses are higher than in CE2, the degree of fill is better and the further curing losses are about the same.

Comparative Example 4 (as in Example 2 of EP-A-0 643 467) (CE4)

The stator is electrically heated in 2 minutes to a winding temperature of 60° C.; during this procedure, the bundle of laminations heats up to about 32° C. and the plastic parts of the end windings heat up to about 28° C. The stator is dipped according to the procedure in CE 1, kept immersed for 10 seconds, taken out and allowed to drip over the impregnation tank for 5 minutes. The winding is then heated in 2 minutes to 150° C. by means of electric power and held at this temperature for 8 minutes. Even during heating and within the first 3 minutes at 150° C., a great amount of partially gelled impregnant which can no longer be recycled comes out of the stator. After heating, the stator is allowed to cool for 5 minutes and is then illuminated according to the procedure in CE 2. After this, the surface is largely tack-free; however shadowed regions of the component which are nevertheless still accessible to contact are still slightly sticky. The component is weighed, allowed to cool and on the next day is cured further for 2 hours at 140° C. During this procedure, the remaining stickiness disappears and the further curing losses can be determined by weighing.

Comparative Example 5 (as in Example 3 of EP-A-0 643 467) (CE 5)

The procedure of CE 4 is repeated, but the stator is heated to 60° C. in an oven before impregnation. The observations during curing and further curing are the same as in CE 4, except that the drip-off losses are somewhat lower since somewhat more undamaged impregnant has flowed out of the uniformly heated component during dripping and back into the dipping bath; the resin uptake is somewhat worse for the same reason.

Example 1 (E1)

Component and impregnant are at a room temperature of 26° C. The component is immersed at 35 mm/minute, the winding is heated to 160° C. in 30 seconds in the dipping tank and held at this temperature for 1 minute, it is then taken out again at the same speed and allowed to drip over the tank for 20 minutes. The material which flows back can be seen to be ungelled by visual inspection; after 20 minutes, virtually no more drips off and good filling of both end windings can be seen by visual inspection. The stator is then illuminated with UV light according to the procedure of CE 2; only a few drops of losses occur during this procedure. After illumination, the winding is heated to 180° C. by electric heating and held at this temperature for 10 minutes. No more drip-off losses occur during this procedure. The bundle of laminations heats up to about 100° C. and the plastic parts of the end windings heat up to about 85° C. Bundle of laminations and end windings are tack-free; even in shadowed regions of the component, no stickiness can be felt by hand. After cooling overnight, the component is cured further for 2 hours at 140° C. on the next day.

Example 2 (E2)

The procedure of Example 1 (E1) is repeated, but the component is held in the immersed state for only 30 seconds. Here too, visual inspection shows both end windings to be well filled, but less than in the case of E1; the further observations are as for E1.

Example 3 (E3)

The procedure of Example 1 (E1) is repeated, but the component is held in the immersed state for 2 minutes. Here, visual inspection shows both end windings to be very well filled, significantly more than in the case of B1; the further observations are as for E1 and E2. Owing to the very much higher resin uptake, vaporization losses and further curing losses are also somewhat higher than in the case of E1 and E2.

Example 4 (E4)

The procedure of Example 3 (E3) is repeated, but, after the UV curing, the components are cured in an oven first for 1 hour at 120° C. and then for a further 2 hours at 130° C. After cooling overnight, they are cured further for 2 hours at 140° C. on the next day.

| Example number | Drip-off loss (g) | Vaporization loss (g) | Resin uptake (g) | Residual styrene (g) |
|---|---|---|---|---|
| CE1 | 24 | 12 | 50 | 3 |
| CE2 | 38 | 16 | 68 | 6 |
| CE3 | 132 | 18 | 106 | 6 |
| CE4 | 51 | 12 | 76 | 7 |
| CE5 | 34 | 10 | 58 | 5 |
| E1 | 1.8 | 9 | 140 | 7 |
| E2 | 2.4 | 7 | 82 | 4 |
| E3 | 1.6 | 11 | 156 | 10 |
| E4 | 2 | 8 | 163 | 6 |

The stators were sawn apart in order to be able to assess the degree of filling. The components from Examples E3 and E4 here display perfect filling of slot and winding, ie. about 150–160 g is the maximum possible resin uptake. Resin uptakes corresponding to a degree of fill of about 100% cannot be achieved using any other process of the prior art. The drip-off, vaporization and further curing losses are likewise smaller than those achieved hitherto. Furthermore, it is possible to set the resin uptake, for example for reasons of cost, to any desired degree of fill, while substantially maintaining the same low losses.

What is claimed is:

1. A process for impregnating a component having at least one electrically conductive winding, said process comprising providing one or more polymerizable impregnants which are liquid at room temperature or can be liquefied by heating, impregnating the component with the one or more polymerizable impregnants at ambient temperature or in a preheated state and, after impregnation, heating the impregnated component in the impregnant until partial gelation by partial curing occurs in the immediate vicinity of the winding, treating the impregnated component with high energy radiation before full curing to seal the surface of the component, and then heating the treated impregnated component to fully cure the impregnated component.

2. The process of claim 1, wherein impregnating the component comprises subjecting the component to a process selected from the group consisting of dipping, flooding, vacuum impregnation, vacuum pressure impregnation, a drip process, and combinations thereof.

3. The process of claim 1, wherein the step of heating the impregnated component in the impregnant is carried out by supplying electric power to at least one electrically conductive winding in the component and removing ungelled impregnant from the component.

4. The process of claim 1, wherein the high energy radiation is selected from the group consisting of UV radiation, infrared radiation, electron radiation, and combinations thereof.

5. The process of claim 1, further comprising treating the impregnated component with infrared radiation before, simultaneously with, or after curing by a different type of energy input.

6. The process of claim 1, further comprising inserting a pause of from 10 to 1200 seconds between impregnating and treating the impregnated component with radiation.

7. The process of claim 1, wherein the polymerizable impregnants comprise monomeric or prepolymerized materials or mixtures of monomeric and prepolymerized materials which are polymerizable by a process selected from the group consisting of free-radically, ionically, hydrogen transfer, polyaddition, polycondensation, cyclocondensation, Diels Alder condensation, and combinations thereof.

8. The process of claim 1, wherein the component is preheated by supplying electric power to the electrically conductive winding to a temperature at which the viscosity of the impregnant is lowered at the winding, and further wherein at least partial gelling by partial curing of the impregnant in the vicinity of the heated winding is then brought about by further supply of electric power to the winding.

9. The process of claim 8, wherein the viscosity of the impregnant in the vicinity of the winding is set by controlling the time and temperature of heating at the electrically conductive winding during partial gelling or curing of the impregnant in such a way that degrees of fill between 5% and 100% are achieved.

10. The process of claim 1, wherein the impregnants comprise an epoxy resin and catalyst or catalyst mixture which initiates polymerization both as a result of heat and as a result of radiation.

11. The process of claim 1, wherein the impregnants comprise an unsaturated polyester resin and a catalyst that initiates polymerization both as a result of heat and as a result of radiation.

12. The process of claim 1, wherein the impregnants comprise dicyclopentadiene building blocks and a catalyst or catalyst mixture which initiates polymerization both as a result of heat and as a result of radiation.

13. The process of claim 1, wherein the impregnants comprise at least one component selected from the group consisting of acylphosphine oxides, C-C-labile substances, peroxides, azo compounds, hydroquinanes, quinones, alkylphenols, alkylphenol ethers, and mixtures thereof.

14. The process of claim 11 wherein the impregnants further comprise one or more copolymerizable materials selected from the group consisting of styrene, α-methylstyrene, allyl ethers, allyl esters, vinyl ethers, vinyl esters, acrylic esters, and mixtures thereof.

* * * * *